United States Patent Office 3,261,892
Patented July 19, 1966

3,261,892
METHOD OF PRODUCING HARDENED BODIES FROM BITUMINOUS MIXES
Albert Sommer, Montagnola, Ticino, Switzerland, and Klaus Schulze, Munich-Pasing, Germany, assignors to Straba Handels-Aktiengesellschaft, Lugano, Switzerland
No Drawing. Filed Apr. 9, 1962, Ser. No. 185,866
Claims priority, application Switzerland, Apr. 11, 1961, 4,241/61
1 Claim. (Cl. 264—29)

The invention relates to the production of molded and hardened bodies from bituminous mixes, and more particularly to the production of electrodes, ore briquettes, plates, slabs and the like.

Electrodes, for metallurgical purposes, are produced from pure carbon, generally from petroleum coke or graphite. The carbon component is applied usually in granular form, in grain sizes varying down to pulverulent masses, and mixed with a bituminous binder, for example with coal tar pitch or asphalt, to form a plastic mass from which shaped bodies are formed by extrusion. These formed bodies are then subjected to high temperatures (from 800 to 1200° C. for long periods), in order to remove all volatile and plastic components of the bituminous binder and to carbonize the remainder, so as to form solid bodies consisting of practically pure carbon (baking process).

We have made the surprising discovery that under certain conditions a pressed bituminous body is self-heating, i.e. its temperature rises for several hundred degrees without supplying heat to the body from an external source. This will occur when the body from the press, i.e. the "green" electrode, while hot, is surrounded by or embedded in a heat insulating mass of a type in which the insulating power preferably is due to air cells contained in the mass, such as inflated perlite, exfoliated vermiculite, expanded clay or the like. Such materials not only retain the heat radiated from the hot molded bodies but return the heat by radiation onto the molded bodies and thus accumulate the heat in these bodies. This leads, beginning at a certain starting temperature, to an exothermic process taking place in the bodies by developing heat internally in the body. The temperature within the bodies increases spontaneously and will reach the temperature required for baking. This process consists of oxydation, polymerization and evaporation of volatiles, resulting in complete carbonizatioin of the bituminous binder. The principle of our invention is based on the observation that in bituminous mixes containing properly distributed air spaces or voids, certain reactions such as described take place and that an oxydation process can be initiated, which at a certain stage will continue spontaneously, and that this process can be brought about, not only by external sources, but by back-radiation of heat from an insulating material surrounding the molded bodies to be treated.

The method of the present invention consists in producing a plastic mixture of solid granular and powdered solid particles and a bituminous binder, molding the mixture, while hot by exerting molding pressure in such a manner as to leave a regularly distributed void content in the molded bodies, and then embedding the hot molded bodies into a chamber lined with a heat insulating, air penetrable material which absorbs the heat emanating from the hot pressed bodies, and radiates the heat back into the bodies to initiate therein an exothermic oxydation process.

A preferred method for the preparation of carbon electrodes is as follows: comminuted petroleum coke of a particle size from dust fineness to about 1 mm. is mixed hot with about 20% by weight of a soft asphalt bitumen. The mixture is made by means of the process described in the U.S. patent specification No. 2,572,068, in which the solid particles are whirled up in a closed container into a zone of floating suspension in which they are sprayed with liquefied binder atomized under high liquid pressure, so that each single particle is individually coated with an extremely thin film of binder. The mixture at a temperature of about 150 to 170° C. is then pressed into shaped bodies of desired dimensions in such manner that the pressed bodies have a void content of about 5 to 15% by volume, whereafter the hot bodies which may be heated somewhat above 170° C. are placed in a chamber in which they are surrounded by a layer of perlite or other heat insulating, air permeable insulating material preferably containing a high proportion of air cells. The insulating layer may have a thickness of about 10 to 20 centimeters, according to the size of the shaped bodies. These latter, destined to be used as electrodes, will chiefly be in the form of cylindrical columns or bars, and since they are in plastic condition when leaving the extrusion press, they may be inserted in sheet metal supporting cylinders for suspension in the perlite lined baking chamber. The supporting cylinders may be perforated.

If after having been placed in the baking chamber, the temperature of the "green" electrodes has decreased to below 170° C., hot air will be supplied into the chamber to raise the temperature above 170° C. At about this temperature the self-heating of the embedded bodies starts spontaneously. According to the size of the molded bodies and the thickness of the insulating layer of the chamber, the temperature within the bodies increases to about 300 to 700° C. An undesired rise of the temperature above 700° may be prevented, for example by partly removing the insulating layer from the baking chamber, whereby the suspended bodies will cool. A convenient way for controlling the temperature of the bodies during hardening is to vary the supply of oxygen to the baking chamber. A reduction of oxygen supply will slow down the oxydation process and cool the electrodes, while an increased oxygen supply will raise the temperature. The baking or hardening of the shaped bodies in the baking chamber will require a time dependent on the size of the electrodes to be obtained. In most cases, the baking time will be a few hours to several days. When the hardening treatment is terminated, the bodies are removed from the insulated chamber.

In a practical example of our invention, comminuted petroleum coke of a particle size of 0 to 0.2 mm. was mixed with 20% by weight of asphalt bitumen. The bituminous mix was extruded at a temperature of 150° C. at a pressure of 140 kg. per cm.$^2$ to form cylinders of 3 cm. height and 4 cm. diameter, which had a void content from 5 to 10%. These formed bodies have been placed in a baking chamber which was lined with a heat insulating perlite layer, and after heating the chamber to 170° C. the contents of the chamber was left alone without supplying any further heat. The temperature of the cylindrical bodies embedded in the perlite then increased to about 300° C. The bodies remained 24 hours in the chamber embedded in the perlite and after this period they were allowed to slowly cool. After this heating treatment the cylindrical bodies had a density of about 1.25 and the water absorption in vacuum was 10–12% by volume. The water absorption corresponds approximately to the porosity of the bodies. The hardened bodies had a compression strength at room temperature of about 150 kg./cm.$^2$.

The production of carbon and graphite formed bodies according to the invention results in a considerable simplification and reduction of cost in the manufacture of electrodes. The baking of the electrodes which hitherto lasted a week or more at temperatures of about 1000° C. is no longer required. With the new process of hardening of the molded bodies by self-heating practically no or very little supply of heat from an external source is required for starting the exothermic oxydation process, and the hardening of the bituminous formed bodies is carried out in a fraction of the time required with the conventional baking methods.

While our invention has been described with particular reference to the manufacture of carbon electrodes, it is obvious that molded hardened bodies from other types of bituminous mixes can be produced according to the described method, for example ore briquettes from a mixture of ore dust and bituminous binder, or plates and slabs for paving purposes.

We claim:

A process for the production of carbon electrodes having uniformly distributed air spaces constituting from 5 to 15% by volume of the electrode which comprises mixing granular to pulverulent carbon particles, spraying said particles with liquid bitumen until each particle is individually coated with bitumen, molding the so-obtained mixture at a temperature of between 150° to 170° C. so that mixture of carbon particles and bitumen has uniformly distributed air spaces constituting from 5 to 15% by volume, placing the heated molded article in a heating apparatus at a temperature of about 170° C. whereby an exothermic reaction takes place in the molded article thereby raising the temperature of said article, allowing the temperature to rise to about 300° C. and maintaining the electrode at this temperature by supplying oxygen and baking the electrode at said temperature.

References Cited by the Examiner

UNITED STATES PATENTS

| | | | |
|---|---|---|---|
| 263,758 | 9/1882 | Brusch | 18—54.7 |
| 917,707 | 4/1909 | Blackmore | 18—54.7 X |
| 1,170,313 | 2/1916 | Naezlschmitz | 264—29 |
| 1,379,366 | 5/1921 | Seabury | 18—54.7 |
| 1,390,823 | 9/1921 | Sieurin | 18—54.7 |
| 2,088,422 | 7/1937 | Kemmer. | |
| 2,527,596 | 10/1950 | Shea | 264—29 |
| 2,572,068 | 10/1951 | Sommer. | |
| 2,594,226 | 4/1952 | Shea. | |
| 3,021,566 | 2/1962 | Sommer. | |

ROBERT F. WHITE, *Primary Examiner.*

MORRIS LIEBMAN, ALEXANDER H. BRODMERKEL, *Examiners.*

S. I. COHEN, R. B. MOFFITT, *Assistant Examiners.*